Figure 1:
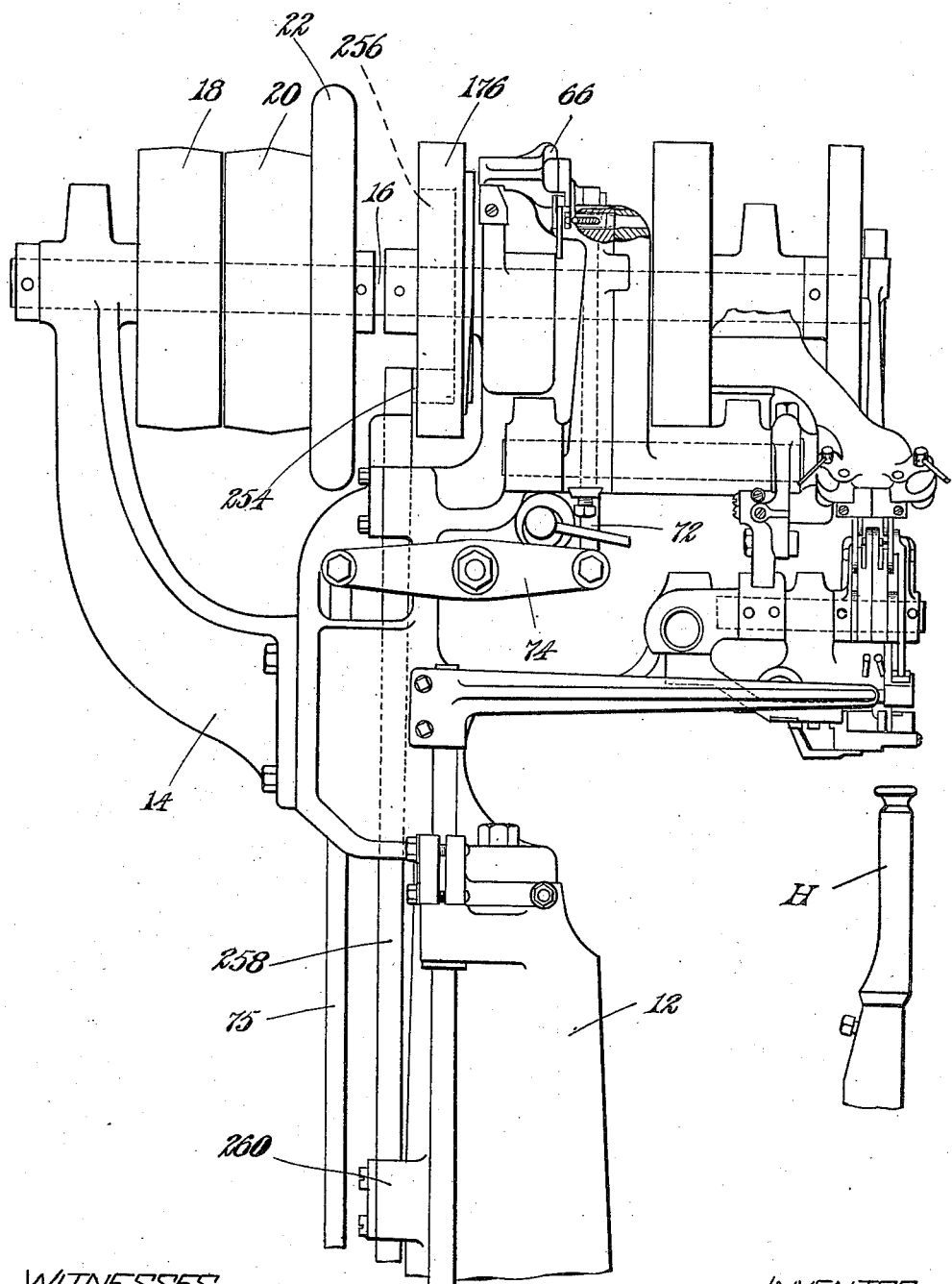

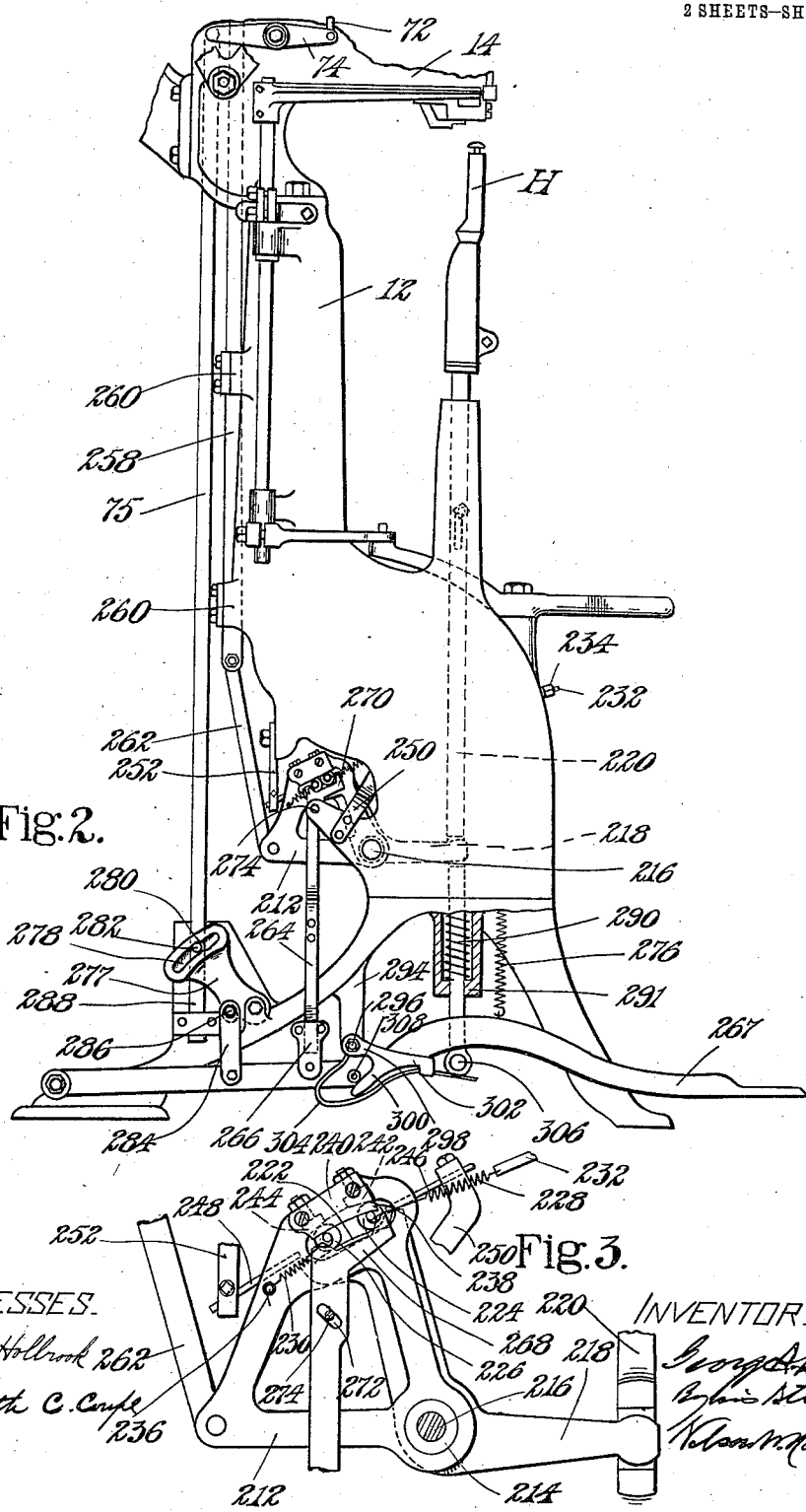

UNITED STATES PATENT OFFICE.

GEORGE A. AMBLER, OF WINCHESTER, MASSACHUSETTS, ASSIGNOR TO UNITED SHOE MACHINERY COMPANY, OF PATERSON, NEW JERSEY, A CORPORATION OF NEW JERSEY.

MECHANISM FOR ACTUATING WORK-SUPPORTS.

1,013,833.      Specification of Letters Patent.      Patented Jan. 2, 1912.

Original application filed October 26, 1906, Serial No. 340,707. Divided and this application filed December 20, 1907. Serial No. 407,326.

*To all whom it may concern:*

Be it known that I, GEORGE A. AMBLER, a citizen of the United States, residing at Winchester, in the county of Middlesex and Commonwealth of Massachusetts, have invented certain Improvements in Mechanisms for Actuating Work-Supports, of which the following description, in connection with the accompanying drawings, is a specification, like reference characters on the drawings indicating like parts in the several figures.

This invention relates to mechanisms for actuating work supports, such, for example, as those used in boot and shoe machinery.

The invention relates particularly to work support actuating mechanism having especial utility in a machine for inserting fastenings.

In those fastening inserting machines which insert fastenings successively provision is usually made for feeding over the work support between successive inserting operations the work upon which the machine is operating. To facilitate the feeding of the work, which is usually clamped during the inserting operation between the work support and a work abutment surrounding the point at which the fastening is driven, means is usually provided for unclamping the work after each inserting operation. In some constructions the work support is caused to hold the work normally clamped against the work abutment by the action of a strong spring which is arranged to hold the work support yieldingly in its uppermost position, release of the work for feeding being effected automatically through connections with the main operating shaft, comprising usually a work thickness compensating clutch, which causes the work to be forced down a predetermined distance against the action of the clamping spring after each fastening inserting operation. In other constructions the work support presses the work normally against the work abutment with a light yielding pressure, and connections with the main shaft are provided, which also comprise usually a work thickness compensating clutch, for automatically clamping the work against the work abutment just before each fastening is driven.

Each of the foregoing types of work support actuating mechanism is of especial utility in certain classes of machines, its utility in each class of machines being dependent upon the nature of the fastening to be inserted, the nature of the work to be operated upon and the method of driving. A third type of work support actuating mechanism, combining the principal advantages of the two types above mentioned and presenting in addition many novel improvements in construction and operation, has been disclosed in my co-pending application for Letters Patent on improvements in machines for inserting fastenings, Serial No. 393,477, filed September 18, 1907 and upon this last mentioned type the present invention is an improvement.

An object of the present invention is to provide, in a work support actuating mechanism having a clutch in the connections between the operating shaft and work support for moving the support away from the work abutment to unclamp the work and another clutch in said connections for moving the support toward the work abutment to clamp the work, means for simultaneously and preferably positively releasing said clutches whereby the work support may be brought automatically into work-receiving position.

A further object of the invention is to provide in a work support actuating mechanism which operates to move the support both into work clamping position and into work releasing position, compensating clutches which will compensate for every variation in the thickness of the work both in the clamping and the releasing operations whereby uniformity of clamping pressure upon the work and uniformity of releasing movement of the work may be insured.

Another object of the invention is to provide, in a machine having a constantly operating shaft, mechanism for causing a work support to be brought into position to hold the work for the operation of the machine and then to cause to be connected with the constantly operating shaft means for effecting, first, a work clamping and then a work releasing action of the work support during each cycle of operations of the machine.

With the above and other objects in view, the invention is herein illustrated as embodied in a machine of the type disclosed in Letters Patent No. 1,005,920, granted Oct. 17, 1911, the present application being a division of the application for said Letters Patent.

For detailed description of features of the construction herein illustrated but which constitute no part of the present invention, reference may be had to said original application above referred to.

It will be noted from the following description that the illustrated embodiment of the invention comprises also novel features of construction and operation, to which attention has not been specifically directed in the foregoing statements but for which protection will be sought in the appended claims.

In the accompanying drawings,—Figure 1 is a side elevation of the upper part of the machine shown in the application of which this application is a division. Fig. 2 is a side elevation of the standard upon which the machine head shown in Fig. 1 is supported, this view showing in detail the work support actuating mechanism. Fig. 3 is a detail view on a larger scale of the two clutches constituting a part of the operating connections between the main shaft and the work support.

Referring to the drawings, 12 is the standard of the machine which has mounted upon it a head or frame 14 carrying in suitable bearings a driving shaft 16 on which are mounted fast and loose pulleys 18 and 20 and a hand-wheel 22 by which the shaft may be turned over slowly by the operator when desired.

Upon the main shaft 16 is mounted a cam disk 176 having upon the right hand side, as viewed in Fig. 1, a cam designed to control the movement in one direction of a lever 66 pivoted at one end upon the machine head and connected by a rod 72 to a second lever 74 also pivoted upon the machine head. The rod 72 is connected to the lever 66 at a point more remote from its pivot than the part which coöperates with the cam upon the cam disk 176. In the fastening inserting machine in which this invention is shown as embodied the main shaft 16 is intended to be kept normally in operation and the arrangement of the cam disk 176, the lever 66 and the parts controlled by said disk and lever is such that the various mechanisms which take part in the fastening inserting operation will be thrown into operation and out of operation at the proper times, so that the said mechanisms will not become inoperative after having been actuated to insert a fastening until the fastening inserting cycle is completed. The lever 74 is connected by a rod 75 and other suitable connections, hereinafter to be described, to a treadle 267.

The work into which the fastening is to be driven is supported upon a horn H which is carried, for reciprocatory movement toward and from the work abutment surrounding the point at which fastenings are inserted by the inserting mechanism, upon the upper end of a rod 220 slidably mounted in the standard 12. The horn is controlled by suitable mechanism which causes it to clamp the work against the work abutment just before a fastening is inserted and to release the work for the work feeding operation, which, in the present machine, is effected by means of an awl, just after the fastening has been inserted. The mechanism for raising and depressing the horn and to which the present invention is particularly directed, is shown as comprising a rocking frame 212 mounted upon a sleeve 214 surrounding a pivot pin 216 in a fork of the standard 12. The rocking frame 212 is of forked construction, and between the two like side members is mounted to oscillate freely on the sleeve 214 an angle lever 218 pivotally connected at one end to the rod 220 which supports the horn H. At its other end the angle lever 218 has a bearing surface 222 concentric with the center of pivot pin 216. Upon the surface 222 bear hardened rollers 224, 226, to the reduced projecting ends of which are attached springs 228 and 230, respectively. The springs, of which there is one at each end of each roller, tend to keep the rollers normally apart. Springs 228 are attached at their outer ends to adjusting members 232 capable of adjustment through the standard 12 by means of nuts 234 engaging the screw-threaded ends of the members 232 projecting through the standard. Springs 230 are connected to pins 236 upon the rocking frame 212. The reduced ends of the rollers 224, 226 travel in slots 238 in the rocking frame 212, these slots being also substantially concentric with the center of pivot pin 216. Plates 240 attached to the sides of rocking frame 212 and projecting into the slots 238 and over the ends of the rollers keep the rollers from endwise movement. The remaining members of the two clutches of which the bearing surface 222 and the rollers 224, 226 are parts are constituted by cam blocks 242, 244, adjustably mounted in recesses in the upper part of the frame 212 directly over the bearing surface 222 and which bear in alternation upon the respective rollers 224, 226 when the rollers are in operative position. The cam surfaces of the cam blocks are so arranged that one block tends to lock the corresponding roller against the bearing surface 222 when the rocking frame rocks in one direction thereby forming a clutch to complete the connection between the horn H and the main driving shaft 16, and the other block operates in a similar manner upon its roller when the frame rocks in the other direction. It is thus apparent that when the rocking frame 212 rocks toward the right hand in Fig. 3 the block 244 will lock its roller 226 against the bearing surface 222 on the angle lever 218, its position upon the surface 222 being dependent upon the thickness of the work clamped between the horn H and the work abutment, and the angle lever will be rocked with the frame 212 and will depress the horn H. Likewise when frame 212 rocks toward the left in Fig. 3, the angle lever 218, through block 242 and roller 224, will be rocked in the other direction and will raise the horn, the point upon the surface 222 at which the roller 224 is locked to it being also dependent upon the thickness of the work. The amount of upward and downward movement of the horn H can be varied by means of adjustable stops 246, 248, carried by arms 250, 252, attached to the standard 12, which stops limit the outward movement of rollers 224, 226, and thus determine the points in the movement of the rocking frame 212 at which the angle lever 218 is locked to it. The frame 212 is rocked continuously while the main shaft 16 is running.

Rocking of the frame 212 is effected through the following connections: A roll 254 upon the upper end of rod 258 engages in a cam groove 256 in one side of the cam disk 176. The rod 258 is reciprocated in guides 260 at each revolution of the cam disk 176 and through its connection 262 with the rocking frame 212 gives to the rocking frame a rocking motion.

Inasmuch as the main shaft 16 is normally in operation, in order to permit work to be removed from or placed upon the work support mechanism must be provided for preventing the operation of the clutches which serve to complete the connections between the horn H and the main shaft 16. This mechanism, in the construction shown, comprises means for forcing the rollers 224, 226 away from the blocks 242, 244, to prevent the locking of the angle lever 218 to the rocking frame 212. The illustrated means comprises a member 264 forked at its upper end and clamped at its lower end between two plates 266 upon the treadle 267 which afford provision for vertical adjustment of the member 264. Each of the fork members at its upper end is provided with an inclined offset portion 268 extending along the slot 238 in frame 212. Extending at right angles to the offset portion 268 are lugs 270 having inclined edges adapted to engage the reduced ends of the rollers and force them together. In order that the movement of the lugs 270 may be at right angles to the path of the rollers, the fork members are each provided with an inclined slot 272 engaging a pin 274 in the standard.

The treadle 267 is normally drawn up by a spring 276. When the treadle is in its raised position the lugs 270 are forced into contact with the reduced portions of the rollers 224, 226 and the rollers are thus held out of locking contact with the cam blocks 242, 244. The rod 75 is drawn down to elevate the lever 66 for starting the insertion of fastenings by means of a lever 277 pivoted upon the base of the machine and having a slot 278 eccentric to the pivot, said slot having a bend in it at 280 for a purpose hereinafter specified. Slot 278 receives a pin 282 on the rod 75. The lever 277 is connected to the treadle 267 by a link 284. Link 284 is connected to the lever 277 by an eccentric pin 286 which provides an adjustment between the lever 277 and the treadle 267. Rod 75 is confined in a guideway 288.

When the treadle is depressed for starting the insertion of fastenings, the rollers 224, 226 are freed from contact with the lugs 270 by the downward movement of the member 264 and the horn actuating mechanism is thus rendered operative. At the same time the lever 277 is rotated toward the left in Fig. 2 drawing down the rod 75 by means of the pin and slot connection therewith, thereby raising the lever 66 and rendering operative the mechanism for inserting fastenings. When the treadle is released its movement into its upper position is controlled by the cam upon the right hand side of the cam disk 176 acting through the lever 66. The particular features of this control relate to the completion of the fastening inserting cycle of operations and therefore constitute no part of the present invention.

It will be sufficient for the purposes of this application to state that if the treadle is released at a certain stage of the fastening inserting cycle of operations the lever 66 will not drop at once to its lowest position but will only drop far enough to permit the treadle to rotate the lever 277 about its pivot toward the right in Fig. 2 until the bend 280 of the slot 278 engages the pin 282 upon the rod 75. This movement of the treadle 267 is not sufficient to bring the lugs 270 into operative contact with the reduced ends of rollers 224, 226 and thus the horn actuating mechanism is not rendered inoperative at this time. When the lever 66 drops to its lowest position it permits the rod 75 to rise far enough so that the treadle 267 may come back to its uppermost position, during which it rotates the lever 277 until the pin 282 is in the lower part of the slot 278.

In order that the thickness of the work may be properly gaged for the action of the two work thickness compensating clutches, means is provided for causing the work support to hold the work with a light yielding pressure against the work abutment during the short time intervening between the action of the clutch which causes the work support to clamp the work for the fastening inserting operation and the action of the clutch which causes the work support to release the work for the work feeding operation. In the illustrated embodiment of the invention the means which causes the horn to tend normally to press the work against the work abutment is brought into operation as the treadle is depressed to start the insertion of fastenings and to set in operation the work support actuating mechanism. When the treadle is in its raised position the horn is permitted to drop in order that it may be in convenient position to receive work or to permit of the removal of the work, and in this position it is shown in Fig. 2 of the drawings.

A cushioning and counterbalancing spring 290 supported in a socket 291 in the machine frame and bearing at its other end against a collar upon the rod 220 serves to counterbalance partially the weight of the horn and its attached parts and to prevent shocks to the mechanism from the contact of the horn with the frame. The spring 290 is, however, not strong enough to support the horn in its elevated position.

Loosely mounted in a bracket 294 extending from the underside of the machine frame is a stud 296 carrying at each end a lever 298. Each of said levers 298 is provided with a rearwardly extending arm 300 having a cam surface and a forwardly extending arm 302 having a downturned recessed end. Two springs 304, secured at one end in any convenient manner to swing with the levers 298 and resting in recesses in the arms 302, extend forwardly and may be caused to engage a pin 306 at the lower end of the rod 220 so as to sustain the horn with a light yielding pressure. Cam rolls 308 on each side of the treadle 267 engage respectively the cam surfaces on the arms 300. The treadle is maintained normally in its elevated position by the spring 276 and is shown in this position in Fig. 2. When the treadle is depressed from the position shown in Fig. 2, the cam rolls 308 bearing upon the arms 300 rock the levers 298 upwardly and cause the springs 304 to bear against the pin 306 to press the horn lightly against the underside of the work which has been placed by the operator in contact with the footplate. The mechanism for initially raising the horn just described is substantially the same as that illustrated in the co-pending application of Louis A. Casgrain, Serial No. 222,022, filed August 24, 1904, to which reference may be had for a more detailed description and illustration.

The operation of the various parts of the work support raising and actuating mechanisms have been described in connection with the foregoing detailed description of these parts and it will therefore be sufficient at this point to briefly set forth the operation of the construction as a whole. The parts being in the position shown in Fig. 2, the operator depresses the treadle 267. During the first part of the downward movement of the treadle 267, the levers 298 are rocked about the stud 296 and the springs 304 are brought into engagement with the pin 306 at the lower end of the rod 220, thus causing the horn H to bring the work supported upon it into contact with the work abutment. This movement of the rod 220 and the horn H rocks the angle lever 218 about its pivot, the amount of rocking movement imparted to the angle lever 218 depending upon the thickness of the work between the upper end of the horn and the work abutment. Further depression of the treadle 267 causes the member 264 to move its lugs 270 out of engagement with the reduced ends of the rollers 224, 226, and the rollers are thus permitted to be clutched alternately between the cam blocks 242, 244 upon the rocking frame 212 which has been constantly in motion, and the surface 222 upon the angle lever 218. The points upon the surface 222 at which the rollers 224 and 226 will be clutched respectively to said surface have been determined by the rocking of the angle lever 218 about its pivot as the horn has been moved upwardly by the springs 304. The horn will now be moved up into clamping position by the clutching of the roller 224 between the block 242 and the surface 222 and will be moved downward into work releasing position by the clutching of the roller 226 between the block 244 and the surface 222 with each complete oscillation of the rocking frame 212. The successive points upon the surface 222 at which the rollers 224 and 226 will be clutched to said surface will obviously depend upon the thickness of the work which is fed between the end of the horn and the work abutment during the work feeding operation and while the horn is in releasing position. Between the unclutching of the roller 224 from, and the clutching of the roller 226 to, the surface 222 there will be a slight interval during which the horn will adjust itself to the thickness of the work under the action of the springs 304 and the angle lever 218 will be moved into such position that its surface 222 will be engaged by the roller 226 at the proper point to give the desired predetermined amount of releasing movement to the work. In like manner during the time which will intervene between the unclutching of the roller 226 from the surface 222 and the clutching of the roller 224 to said surface the horn will again be permitted to adjust itself to the thickness of the work, in case there has been any variation, and the angle lever will be moved into such position that its surface 222 will be in proper position to cause the desired predetermined amount of clamping pressure to be exerted upon the work. During the last part of the downward movement of the treadle 267 the lever 277 will be rocked toward the left in Fig. 2 until the pin 282 upon the rod 75 is brought into the upper part of the slot 278 and the rod 75 is thus drawn down causing the lever 66 to be elevated, thereby setting in operation the fastening inserting mechanism. When the treadle is released the various mechanisms will be thrown out of operation in reverse order.

It will be noted that the provision of rollers for locking together two relatively movable parts of the connections between the work support and the operating shaft permits an exact adjustment of these connections to compensate for every variation in the thickness of the work both in preparation for the work clamping movement of the work support and in preparation for its work releasing movement. Uniformity of these movements in successive operations is thereby insured. It will be noted further that the positions of the rollers with respect to the relatively movable parts between which they are situated may be independently varied whereby the amount of work clamping movement of the work support may be varied without affecting the amount of work releasing movement of said support and vice versa.

The term "roller" as used in the appended claims is not intended to be restricted in its application to a cylindrical rolling body.

Having described my invention, what I claim as new and desire to secure by Letters Patent of the United States is:—

1. In a machine of the class described the combination with a work support and automatic means for moving said work support into work clamping and then into work releasing position, comprising oppositely operating clutches, of means for simultaneously rendering said clutches inoperative while a part of said automatic means continues to operate.

2. In a machine of the class described, the combination with a work support and automatic means for moving said work support into work clamping and then into work releasing position, comprising oppositely operating clutches, of a single means for rendering said clutches inoperative while a part of said automatic means continues to operate.

3. In a machine of the class described, the combination with a work support and automatic means for moving said work support into work clamping and then into work releasing position, comprising oppositely operating clutches, of a single means for moving a member of each of said clutches positively into inoperative position.

4. In a machine of the class described, the combination with a work support, of automatic means for moving said work support into work clamping position and then into work releasing position, comprising oppositely operating work thickness compensating clutches, and means for simultaneously rendering said clutches inoperative while a part of said automatic means continues to operate.

5. In a machine of the class described, the combination with a constantly operating shaft, a work support and automatic means for moving said work support into work clamping and then into work releasing position, comprising oppositely operating clutches, of means for interrupting the action of said clutches while said shaft continues in operation whereby the movement of the work support is also interrupted.

6. In a machine of the class described, the combination with a constantly rotating shaft, a work support and operating connections between said shaft and said work support for automatically reciprocating said support, comprising oppositely operating clutches, of means for holding members of said clutches out of operative relation to other members of said clutches while the shaft continues to rotate whereby the actuation of the work support may be interrupted.

7. In a machine of the class described, the combination with a constantly operating shaft and a work support, of means for bringing said work support into operative connection with said shaft, comprising oppositely operating clutches arranged to operate in automatic succession, portions of which are in constant connection with said shaft, and means under the control of the operator for causing other portions of said clutches to be brought into or out of operative relation to the constantly moving portions.

8. In a machine of the class described, the combination with a constantly rotating shaft and a work support, of means for moving said work support into work clamping position and then into work releasing position, comprising connections between the rotating shaft and the work support including a plurality of rollers situated between relatively movable parts of the connections and so arranged with respect to said relatively movable parts that one roller locks said parts together to cause the work support to be moved into work clamping position and another roller locks said parts together to cause the work support to be moved into work releasing position.

9. In a machine of the class described, the combination with a work support, of mechanism for actuating said work support, comprising relatively movable members one of which has oppositely inclined faces, rollers interposed between said relatively movable members and so arranged with respect thereto that one of said rollers coöperates with one of said faces to effect a locking together of said members for movement in one direction and that another roller coöperates with another face to effect a locking together of said members for movement in another direction.

10. In a machine of the class described, the combination with a work support and work support actuating mechanism, comprising means for effecting positively a work clamping movement of said work support and means for effecting positively a work releasing movement of said work support, said means being constructed and arranged to operate in automatic succession, of means for rendering inoperative said last named two means while a part of said mechanism continues to operate.

11. In a machine of the class described, the combination with a work support and automatic means for moving said work support into work clamping and then into work releasing position, comprising oppositely operating clutches, of a treadle yieldingly held normally in inoperative position, and means controlled by said treadle for simultaneously rendering said clutches inoperative as the treadle returns from operative to inoperative position.

In testimony whereof I have signed my name to this specification in the presence of two subscribing witnesses.

GEORGE A. AMBLER.

Witnesses:
H. DORSEY SPENCER,
FREDERICK L. EDMANDS.

Copies of this patent may be obtained for five cents each, by addressing the "Commissioner of Patents, Washington, D. C."